US008769831B2

(12) United States Patent
Duvall (10) Patent No.: US 8,769,831 B2
(45) Date of Patent: Jul. 8, 2014

(54) COMBINATION STRING AND BLADE TRIMMER HEAD

(76) Inventor: Randy A. Duvall, Fairborn, OH (US)

( * ) Notice: Subject to any disclaimer, the term of this patent is extended or adjusted under 35 U.S.C. 154(b) by 252 days.

(21) Appl. No.: 13/446,348

(22) Filed: Apr. 13, 2012

(65) Prior Publication Data

US 2012/0260508 A1 Oct. 18, 2012

Related U.S. Application Data

(60) Provisional application No. 61/475,154, filed on Apr. 13, 2011.

(51) Int. Cl.
*A01D 34/67* (2006.01)

(52) U.S. Cl.
USPC .................................. 30/276; 30/122; 30/329

(58) Field of Classification Search
USPC .................... 30/276, 275.4, 329, 122; 56/12.7
See application file for complete search history.

(56) References Cited

U.S. PATENT DOCUMENTS

| 4,905,465 | A | 3/1990 | Jones |
| 4,962,630 | A | 10/1990 | Jones |
| 6,108,914 | A | 8/2000 | Sheldon |
| 6,427,341 | B1* | 8/2002 | Lee ................................ 30/347 |
| 7,603,782 | B2 | 10/2009 | Jerez |
| 2008/0010836 | A1* | 1/2008 | Iacona ........................... 30/122 |
| 2008/0196255 | A1* | 8/2008 | Strader .......................... 30/276 |
| 2010/0083506 | A1* | 4/2010 | Bennett .......................... 30/122 |

* cited by examiner

*Primary Examiner* — Stephen Choi
(74) *Attorney, Agent, or Firm* — Temmerman Law Office; Mathew J. Temmerman (57) ABSTRACT

A trimmer head for cutting vegetation is adaptable to operate in blade trimming mode and in monofilament trimming mode, and requires minimal time and effort to change between the two modes. The device comprises a bottom plate and a top plate. The top and bottom plate are urged together, thereby locking the blades in place. When the top and bottom plate are separated and rotated relative to one another, a blade may be inserted or removed from the blade posts by a gap formed between the top of the blade post and the top plate. The top plate includes a surface having a plurality of trimmer blade posts adaptable to pivotally mount at least one trimmer blade. The top plate further comprises a plurality of monofilament holes for receiving a monofilament line therethrough.

22 Claims, 9 Drawing Sheets

COMBINATION STRING AND BLADE TRIMMER HEAD

RELATED APPLICATION

This application claims priority from the U.S. provisional application with Ser. No. 61/475,154, which was filed on Apr. 13, 2011. The disclosure of that provisional application is incorporated herein as if set out in full.

BACKGROUND OF THE INVENTION

1. Technical Field of the Invention

The present invention relates in general to string and blade trimmers and the rotating heads of such trimmers. More specifically, the present invention provides a two-mode convertible trimmer head having in a first mode outwardly extending monofilaments and in a second mode outwardly extending blades, all for cutting vegetation when the monofilaments or blades are rotating in a cutting plane. Both the blades and the monofilament lines of the trimmer head are replaceable by the user without the use of tools.

2. Description of the Related Art

Vegetation trimmers are well known devices used to cut weeds, grass, and other vegetation. The vegetation trimmer, or simply "trimmer", generally comprises an elongated handle assembly having one or more handgrips and a power source proximate to the upper end, and a rotating trimmer head proximately mounted at a lower end. The trimmer head generally comprises one or more radially outwardly extending flexible monofilaments or pivotally mounted blades. As the trimmer head is rotated by the power source at a high rotational velocity, the blade(s) or monofilament(s) are spun in a cutting plane for shearing grass, weeds, and the like. The rotational power is generally is supplied by a gas or electric motor. Many versions of these trimmer devices are known and many improvements have been made over the years.

While monofilament based trimmer heads are appropriate for edging and for cutting grass, weeds, and other light vegetation, a growing number of trimmer heads have incorporated rigid, pivotally mounted blades made of plastic, metal, a combination thereof, or other suitable components. These blades offer the advantage of allowing a trimmer to cut thicker, tougher, woody vegetation such as saplings and low bushes that monofilament heads cannot. Though such blade-based trimmer heads offer clear advantages, there are drawbacks including increased torque requirements, a decreased radius of the cutting plane, reduced grass cutting efficiency as the blades dull over time, and increased risk of the trimmer flinging small objects at high velocity (rocks, bits of wood, etc.) at people, pets or other objects. Blades also cannot be used against a curb, fence, or other hard surface, which makes them impractical for edging. Finally, blades do not benefit from the self-replenishing mechanisms that automatically (or in the case of bump and feed trimmers, manually during use) dole out additional trimmer line. With blades, the user must completely stop the motor and through the use of a tool manually is remove the worn blades and install new blades.

Because there are distinct advantages and disadvantages to both monofilament string and blade-based trimmer heads, it is often advantageous for the user to have both. When both are used, each may be used in an area where its strengths are maximized. The downside to this approach is that it necessitates the need to have two separate trimmer heads on hand, one configured for use with monofilament line and another configured for use with blades. Further, the user must change the trimmer head attached to the trimmer, a process which often takes much of the user's time, requires the use of tools, and depending on the complexity of the task and the skill of the operator is oftentimes difficult to accomplish. The ownership of multiple trimmers, each equipped with a different trimmer head can be economically impractical, and requires additional space for storage and time for maintenance.

It is thus desirable to provide a trimmer head that has both a blade trimming mode and a monofilament-trimming mode. Most attempts at such a two mode trimmer head have required the complex disassembly and reassembly of the trimmer head. These operations are time consuming, require tools, and may be technically complex.

Hence, it can be seen that there is a need for an improved two-mode trimmer head. Such a device should not require tools to change the trimmer heads, thus requiring minimal time and effort to change between the two modes. There should also be no need to use tools to replace broken monofilament or blades, resulting in less complexity and requiring minimal time and effort for such replacement. The current application discloses the novel changes to the two-mode trimmer head, which result in these improved efficiencies.

SUMMARY OF THE INVENTION

In order to minimize the limitations found in the prior art, and to minimize other limitations that will be apparent upon the reading of the specification, the present invention provides a trimmer head adaptable to operate in two modes. The trimmer head does not require the use of tools to change between the two modes.

The trimmer head comprises a bottom plate, a midsection and an upper section. The midsection and upper section may be grouped together as a top plate. The bottom plate further comprises a bottom plate bottom surface with a bottom plate hole and a bottom plate top surface. The bottom plate top surface includes a plurality of first level sections, a plurality of second level sections, a plurality of first level holes located on the plurality of first level sections and a plurality of bottom plate recessed sections. The combination of upper section and midsection (or the integrated top plate) is removably attached to the bottom plate. The midsection includes a midsection bottom surface (the bottom surface of the top plate) having a plurality of trimmer blade posts adaptable to pivotally mount at least one trimmer blade thereon to operate the trimmer head in a blade trimming mode and a plurality of midsection bottom recessed portions. The midsection top surface includes a plurality of midsection monofilament holes for receiving one monofilament line therethrough, a plurality of midsection fastening holes and a midsection central hole. The midsection further comprises a plurality of monofilament conduits running therethrough and adaptable to engage with the at least one monofilament line therewith so the trimmer head may be operated in monofilament trimming mode.

When the trimmer head operates in the blade trimming mode, the plurality of trimmer blade posts in the midsection bottom surface connect with the plurality of first level holes located on the plurality of first level sections of the bottom plate to engage the at least one trimmer blade between at least one of the plurality of trimmer blade posts and at least one of the plurality of first level sections. When the trimmer head operates in the monofilament-trimming mode, the trimmer blades are preferably not present, and instead at least one monofilament trimmer line is threaded through at least one monofilament conduit running through the top plate (that is, the combined unit comprising the midsection and top section). Although it is possible for the device to operate simultaneously with both trimmer blades and monofilament line, it is not optimal. When the bottom plate is spaced away from from and rotated relative to the top plate, at least one of the plurality of trimmer blade posts is disengaged from the bottom plate such that the at least one trimmer blade may be removed therefrom and optionally replaced with a new blade. When the bottom plate is further rotated relative to the top plate, the bottom plate may be compressed toward the top plate thereby reengaging the at least one of the plurality of trimmer blade posts thereto, and locking the at least one trimmer blade to the post.

The upper section includes an upper section top surface (the top surface of the upper plate) having a trimmer mount designed to attach the trimmer head with a trimmer. The upper section further includes a plurality of upper section fastening holes and a plurality of upper section monofilament holes aligned with the plurality of midsection monofilament holes in the midsection top surface. The upper section may be removably attached from the midsection using a plurality of fasteners. Each of the plurality of fasteners is designed to insert through the plurality of upper section fastening holes and the plurality of midsection fastening holes. A plurality of connectors securely connects the plurality of fasteners in the plurality of upper section fastening holes. Typically the fasteners are threaded bolts and the connectors are nuts.

The top plate and bottom plate are generally held together by a retaining and rotation component. The retaining and rotation component preferably takes the form of a pin or post and allows the bottom plate to extend and rotate about a central axis of the trimmer head relative to the midsection top plate. The engagement of the midsection's bottom surface to the bottom plate's top surface allows the operator to easily and effectively convert the trimmer head from blade trimming mode to monofilament trimming mode. In this conversion the operator may cause the trimmer head to disengage or engage the at least one trimmer blade and/or the at least one monofilament line without utilizing any tools. The trimmer head requires minimal time and effort to change between the blade trimming mode and the monofilament-trimming mode.

Quite specifically, when the bottom plate is spaced away from and rotated relative to the top plate, the at least one trimmer blade is removed through a gap formed between an end portion of the at least one of the plurality of trimmer blade posts and the at least one of the plurality of first level sections. The retaining and rotation component includes a spring, which urges the bottom plate against the top plate. The retaining and rotation component preferably comprises a shaft, a spring, a washer, a retaining pin and a pin hole to receive the retaining pin. The bottom plate hole is located at the center of the bottom plate bottom surface and includes a bottom plate counter-bore therein. The midsection central hole is located at the center of the midsection bottom surface and includes a midsection counter-bore therein.

These and other advantages and features of the present invention are described with specificity so as to make the present invention understandable to one of ordinary skill in the art.

BRIEF DESCRIPTION OF THE DRAWINGS

In order to enhance their clarity and improve understanding of the various elements and embodiments of the invention, these elements in the figures have not necessarily been drawn to scale. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE INVENTION

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
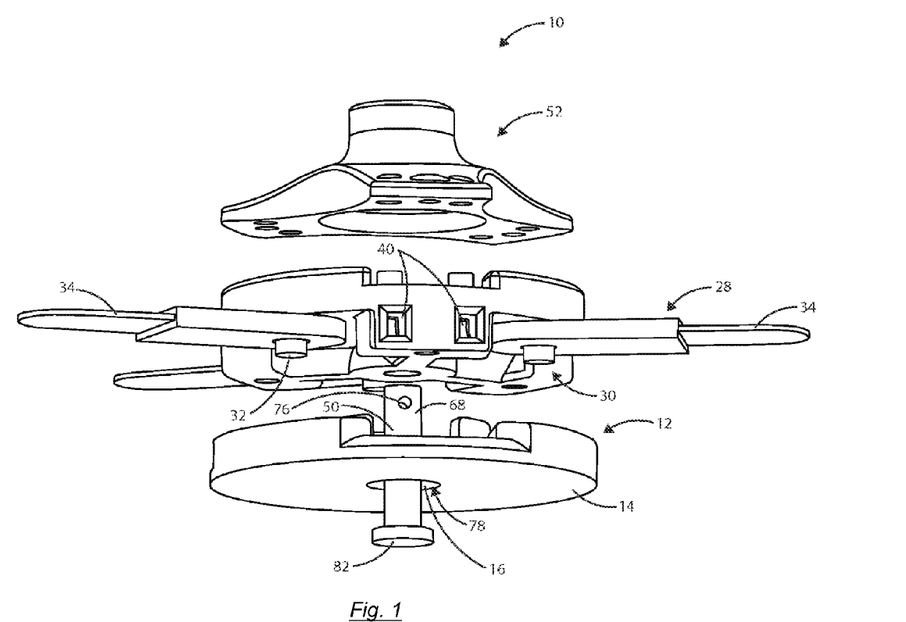
FIG. 1 is an exploded perspective view of a trimmer head according to the present invention.
Figure 17:
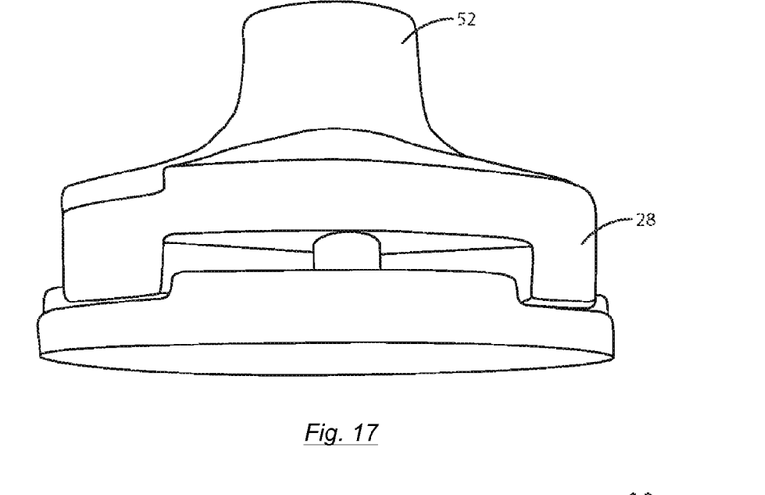
FIG. 17 is a diagrammatic view of the two mode trimmer head in a retracted configuration and wherein the midsection and top section are integrated together as a top plate.

Referring to FIG. 1, an exploded perspective view of a trimmer head 10 adaptable to operate in two modes is shown. The two modes are blade trimming mode and monofilament trimming mode. The trimmer head 10 comprises a top plate 11 and a bottom plate 12. The top plate may be one integrated unit as shown in the diagrammatic FIG. 17 wherein the midsection 28 and an upper section 52 are integrated together as one component.

Figure 3:
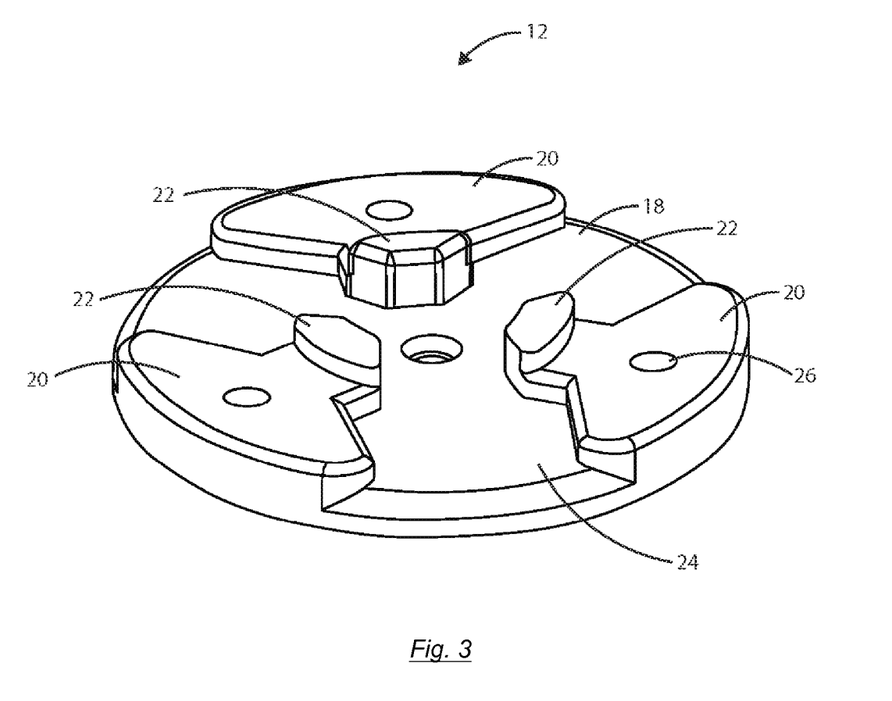
FIG. 3 is a top perspective view of the top surface of the bottom plate of the trimmer head.

In this preferred embodiment, the bottom plate 12 is substantially circular when viewed from top and comprises a substantially planar bottom plate bottom surface 14 and a bottom plate top surface 18 (see FIG. 3). The trimmer head 10 further comprises a retaining and rotation component 50. In the preferred embodiment, the retaining and rotation component 50 comprises a shaft 68 passing through a bottom plate hole 16 located in the center of the bottom plate 12. The bottom plate hole 16 includes a bottom plate counter-bore 78. The shaft 68 terminates at a lower end in a flange 82 configured to mate with the bottom plate counter-bore 78. The retaining and rotation component 50 urges the bottom plate 12 against the midsection 28 (and hence the entire top plate 11) and further allows the bottom plate 12 to rotate about a central axis of the trimmer head 10. The retaining and rotation component 50 further allows the bottom plate 12 to be extended relative to the midsection 28 (and hence the entire top plate 11) when the urging force is overcome, typically by the user's two hands. The retaining and rotation component 50, in the preferred embodiment further comprises a spring 70 (FIG. 6), a washer 72 (FIG. 6), a retaining pin 74 (FIG. 6) and returning to FIG. 1 a retaining pin hole 76 disposed above the midsection 28. Here the retaining pin 74 enters the retaining and rotation component 50 and traverses therethrough. Thus, force from the spring is transferred to provide the urging force keeping the bottom plate 12 against the midsection 28. The force may also be said to keep the bottom plate 12 urged against the top plate 11. The force involved is preferably approximately 10 pounds of force, however, varying amounts of force may be used from between 5 and 40 pounds. The force urges the components together until the urging force is overcome, at which time the bottom plate 12 is extended relative to the midsection 28 or top plate 11 as shown in a series of depictions in FIGS. 10-12. The retaining and rotation component may be formed integrally with the bottom plate 12.

In this preferred embodiment, the midsection 28 is circular when viewed from the top and comprises a midsection top surface 84 (labeled in FIG. 6) and a midsection bottom surface 30 as shown in FIG. 1. Continuing with FIG. 1, the midsection bottom surface 30 comprises a plurality of trimmer blade posts 32 to which at least one trimmer blade 34 may be pivotally mounted. In the preferred embodiment, the plurality of trimmer blade posts 32 is three in number, and one trimmer blade 34 is mounted to each. In alternative embodiments, the midsection 28 may comprise a different number of trimmer blade posts 32 such as two, four, or five, each to receive a blade.

Figure 18:
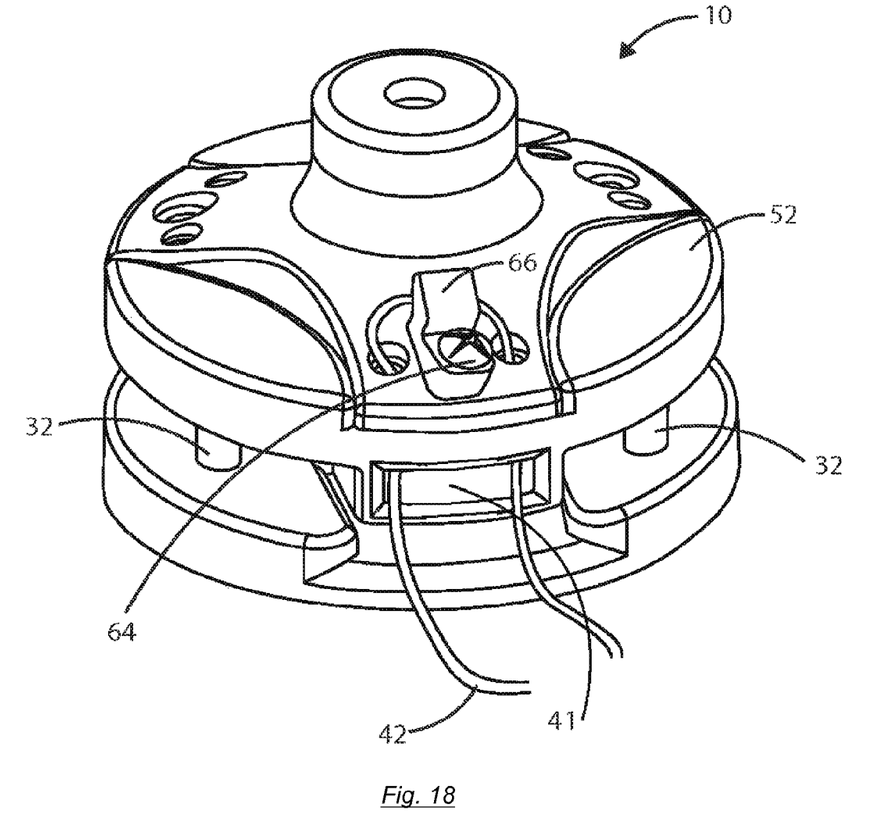
FIG. 18 is a perspective view of the invention according to a first alternative embodiment.

The midsection 28 further comprises a plurality of monofilament conduits 40 preferably arranged in pairs around the circumference of the midsection 28. These monofilament conduits 40 allow a monofilament trimmer line 42 (see FIG. 15) to be mounted to the midsection 28. In the preferred embodiment, the plurality of monofilament conduits 40 is six. Alternative embodiments of the present invention may comprise a different number of monofilament conduits 40 such as four or eight. In yet another alternative embodiment, a separating wall between each pair of the monofilament conduits 40 is removed, thereby creating one larger monofilament opening 41 which one or more sections of the at least one monofilament line 42 (see FIG. 18) may be threaded therethrough. In each of these embodiments, an opening of the plurality of monofilament conduits 40 or plurality of monofilament openings 41 is preferably flared or beveled (such that the opening is larger in proportion to the distance from the axis of rotation of the trimmer head 10) in order to remove hard shearing surfaces against which the monofilament line 42 (FIG. 15) might otherwise come into contact.

The upper section 52, in the preferred embodiment, attaches to the midsection 28 by a plurality of fasteners 64 (see FIG. 8) such as screws, bolts, clips and the like. The upper section 52 may in the alternative be integrated with the midsection 28 such as is shown in diagrammatic FIG. 17. The upper section 52 comprises a trimmer mount 58 (see FIG. 7) as known in the art in order to attach the trimmer head 10 to a trimmer (not shown). The upper section 52 further comprises a plurality of upper section monofilament holes 62 (see FIG. 7) to allow communication to the plurality of monofilament conduits 40. Essentially, the monofilament conduit 40 may be said to communicate to the upper section where it takes the name of monofilament hole 62. In practice, the monofilament conduit 40 and the monofilament hole 62 are one long conduit through which at least one monofilament line may be threaded therethrough. The monofilament line may also be described as threaded through the upper section monofilament holes 62 and out the monofilament conduits 40 as further described with respect to FIG. 15.

Figure 2:
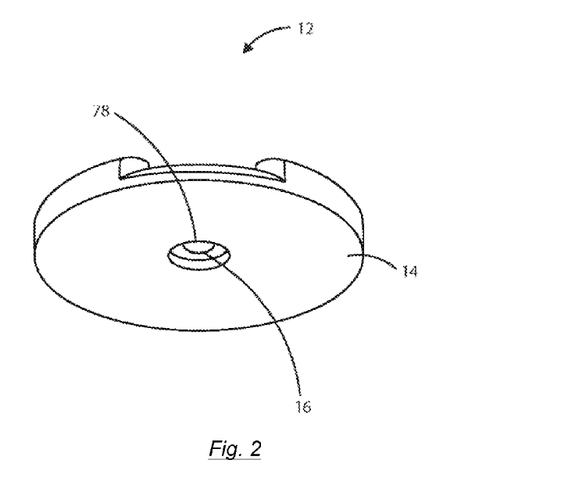
FIG. 2 is a bottom perspective view of a bottom plate of the trimmer head.

As shown in FIG. 2, a bottom perspective view of the bottom plate 12 is illustrated. The bottom plate counter-bore 78 is centered on the bottom plate hole 16 and is of appropriate depth and width to accept the flange 82 such that the retaining and rotation component 50 preferably becomes flush with the bottom plate bottom surface 14 when the trimmer head 10 is assembled.

Referring to FIG. 3, a top perspective view of the bottom plate 12 is shown. The bottom plate top surface 18 comprises a plurality of first level sections 20 having a first elevation. When the trimmer head 10 operates in the blade-trimming mode, two configurations are possible. The two configurations are engaged or use configuration and an adjustment configuration. In the engaged or use configuration of the trimmer head 10, the plurality of first level sections 20 is configured to make contact with the plurality of trimmer blade posts 32 located on the midsection. In an alternative embodiment the relative positions of blade posts and contact sections are reversed, meaning that the blade posts may be positioned on the bottom portion while the contact point may be positioned on the midsection or top plate.

Continuing with the preferred embodiment and with respect to FIG. 3, the bottom plate top surface 18 further comprises a plurality of second level sections 22 that are spaced to a second elevation. In the adjustment configuration of the trimmer head 10, the plurality of second level sections 22 provides additional distance between the bottom plate 12 and the midsection 28 and holds the bottom plate 12 away from the midsection 28 while the user rotates the two components relative to one another. In alternate embodiments, there may be a different number of first level sections 20, and different number of second level sections 22.

The bottom plate top surface 18 further includes a plurality of bottom plate recessed sections 24. The plurality of bottom plate recessed sections 24 are configured to mate with the plurality of first level sections 20 and the plurality of second level sections 22 in the blade trimming mode and the monofilament trimming mode. In the blade trimming mode engaged use configuration and in monofilament trimming mode, the plurality of trimmer blade posts 32 connects with the plurality of first level holes 26, thereby preventing the addition or removal of blades to said posts. When the bottom plate 12 is extended and rotated relative to the midsection 28 or top plate 11, the plurality of trimmer blade posts 32 become disengaged from the plurality of first level holes 28, and therefore trimmer blade 34 may be disengaged from the at least one of the plurality of trimmer blade posts 32 (see FIGS. 13-14).

Figure 4:
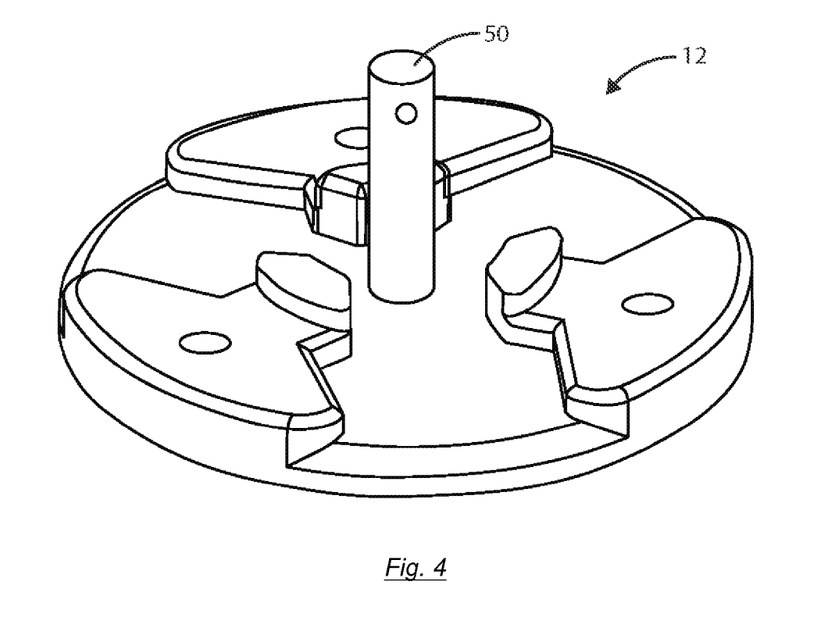
FIG. 4 is a perspective view of the bottom plate top surface and a retaining and rotation component of the trimmer head.

Referring to FIG. 4, a top perspective view of the bottom plate 12 and the retaining and rotation component 50 is shown. As may be seen, in the preferred embodiment, the retaining and rotation component 50 passes through the bottom plate hole 16 (not visible in FIG. 4 due to presence of the rotation component 50) and is spaced away from the bottom plate 12 and ultimately through the midsection 28.

Figure 5:
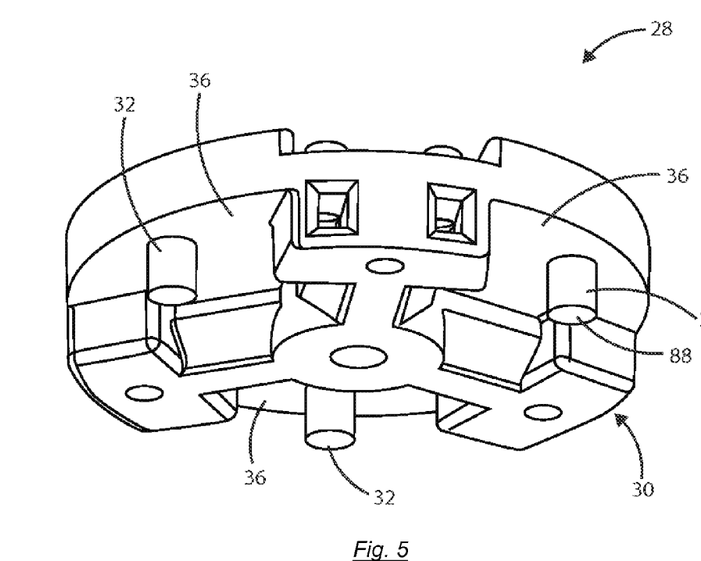
FIG. 5 is a bottom perspective view of the bottom plate and the bottom surface of a midsection of the trimmer head.

As shown in FIG. 5, a bottom perspective view of the midsection 28 is shown. In this preferred embodiment, the midsection bottom surface 30 is substantially planar and comprises three midsection recessed sections 36 that are configured to mate with the three first level sections 20 and the three second level section 22 of the bottom plate 12 such that in a engaged or use configuration, the bottom plate 12 and the midsection 28 are flush (the plurality of first level sections 20 is in contact with the plurality of trimmer blade posts 32 and the bottom plate top surface 18 is in contact with the midsection bottom surface 30). In the adjustment configuration, the bottom plate 12 has been spaced away from and rotated relative to the top plate 11 and consequently midsection 28 and the at least one trimmer blade 34 may be removed through a gap formed between an end portion 88 of the at least one of the plurality of trimmer blade posts 32 and the at least one of the plurality of first level sections 20. In this preferred embodiment, the plurality of trimmer blade posts 32 (see FIG. 5) are located in the plurality of bottom plate recessed sections 24 (See FIG. 3). In alternate embodiments, there may be a different number of recessed sections 24, such as two, four, or other numbers. In further alternative embodiments, the trimmer blade post may be positioned on the bottom plate and the blade may be removed through the gap created between the top of the trimmer blade post and a bottom surface of the midsection when the bottom plate and midsection are similarly rotated respective to one another. When the trimmer head 10 operates in the blade trimming mode, the plurality of trimmer blade posts 32 in the midsection bottom surface 30 connect with the plurality of first level holes 26 located on the plurality of first level sections 20 to firmly engage the at least one trimmer blade 34 between the end portion 88 of at least one of the plurality of trimmer blade posts 32 and the at least one of the plurality of first level sections 20.

Figure 6:
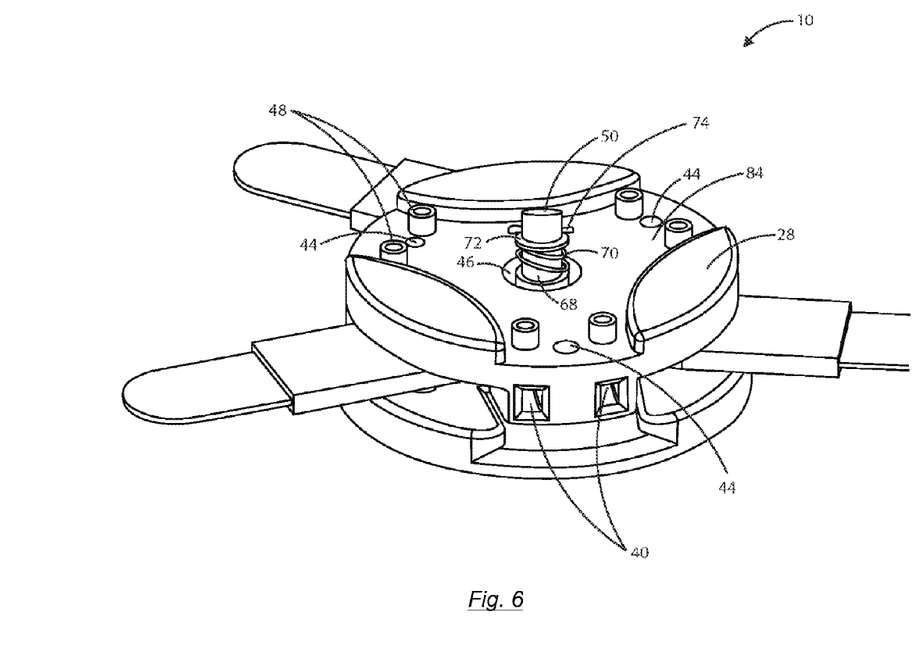
FIG. 6 is a top perspective view of the retaining and rotation component and the midsection and bottom plate of the trimmer head.

Referring to FIG. 6, a top perspective view of the bottom plate 12, the retaining and rotation component 50 and the midsection 28 are shown. In this view, the trimmer head 10 is in the engaged or in use configuration. In the preferred embodiment, the retaining pin 74 passes through the retaining pin hole 76 (see FIG. 1). Turning back to FIG. 6, spring 70 is disposed around the shaft 68, rests in the bottom plate hole 16 and is compressed by the washer 72. This arrangement of the shaft 68, the flange 82, the spring 70, the washer 72, the bottom plate 12, the midsection 28 and the bottom plate hole 16 urge the bottom plate 12 against the midsection 28. When the washer 72 compresses the spring 70 downwards, an urging force is generated. This urging force causes the middle section 28 and the bottom plate 12 to engage one another. While in the preferred embodiment the urging force is generated from a spring, alternative embodiments may employ any suitable means known in the art to generate the force. When the middle section 28 and bottom plate 12 are pulled apart from one another by a force great enough to exceed the urging force, they may then be rotated relative to one another from their position in the engaged or in use configuration, as described in greater detail with respect to FIGS. 12 and 13.

In the preferred embodiment, the midsection top surface 84 comprises the plurality of midsection monofilament holes 48 for receiving the at least one monofilament line 42 therethrough, a plurality of midsection fastening holes 44 and a midsection central hole 46. In the preferred embodiment, there are six monofilament conduits 40 arranged in evenly spaced pairs around the circumference of the midsection 28, offset by sixty degrees from the trimmer blade posts 32, which in this configuration are three in number.

Figure 7:
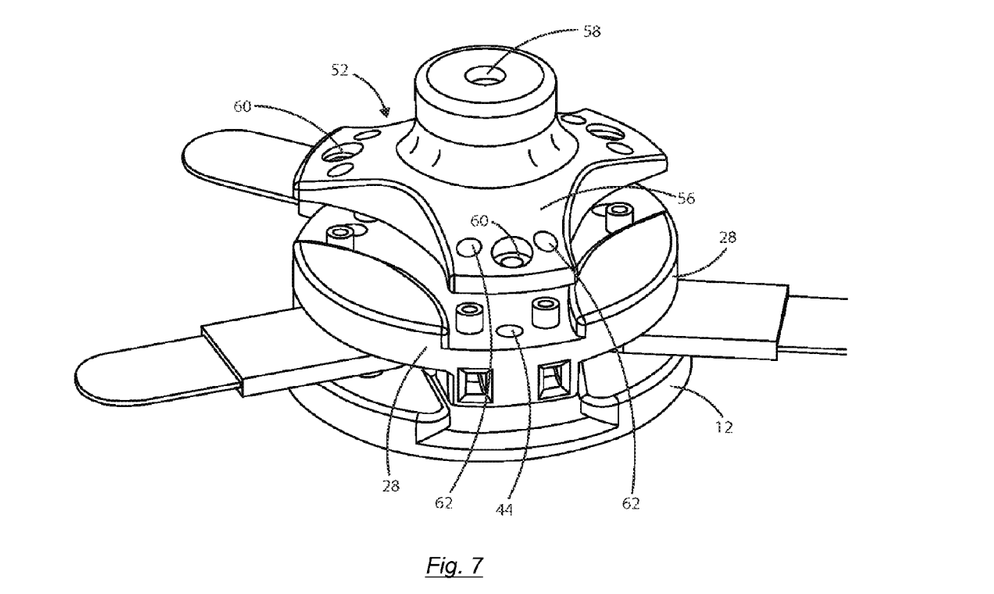
FIG. 7 is an exploded perspective view of the bottom plate, the midsection, and an upper section of the trimmer head.

As shown in FIG. 7, a partially exploded perspective view of the bottom plate 12, the midsection 28 and the upper section 52 is illustrated. In the preferred embodiment, the upper section 52 comprises an upper section bottom surface 54 (see FIG. 9) and an upper section top surface 56. The upper section top surface 56 includes the trimmer mount 58, which as is known in the art allows the trimmer head 10 to be attached to the trimmer using nuts, bolts, and/or other conventionally known items (not shown), the plurality of upper section monofilament line holes 62 that allow access to the plurality of monofilament conduits 40, and a plurality of upper section fastening holes 60 configured to accept standard screws or bolts to rigidly attach the upper section 52 to the midsection 28. As labeled on FIG. 15, the trimmer head 10 further comprises a plurality of connectors 66 for securely connecting the plurality of fasteners 64 in the plurality of upper section fastening holes 60.

Figure 8:
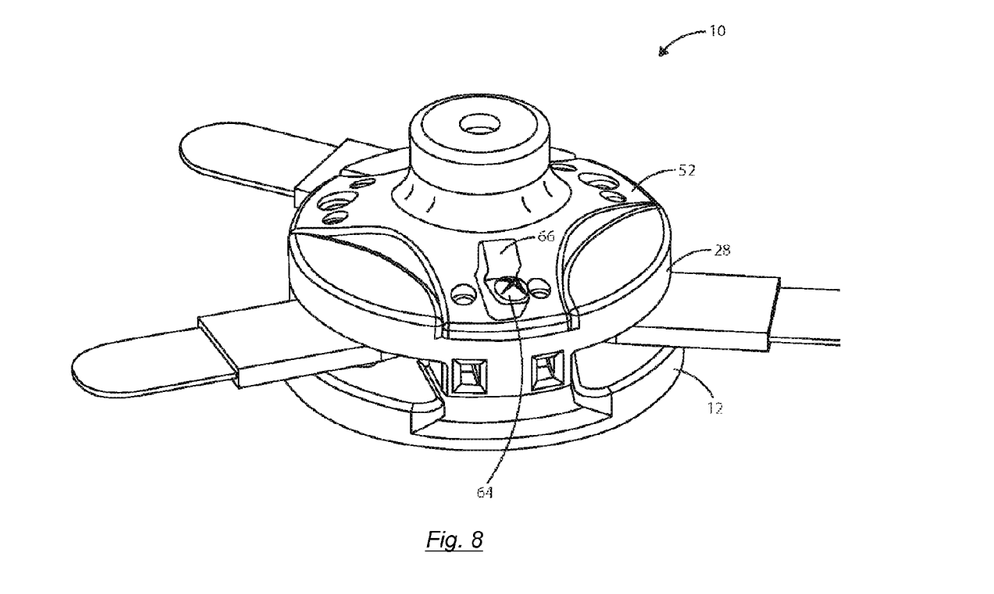
FIG. 8 is a top perspective view of the bottom plate, the midsection and the upper section of the two mode trimmer head.

Referring to FIG. 8, a perspective view of the bottom plate 12, the midsection 28 and the upper section 52 is shown. This figure depicts the preferred embodiment of the trimmer head 10 fully assembled and in a engaged or use configuration.

Figure 9:
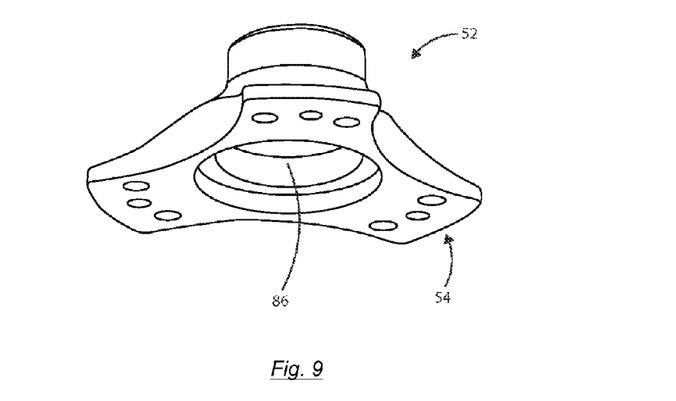
FIG. 9 is a bottom perspective view of an upper section bottom surface of the trimmer head.

Referring to FIG. 9, a bottom perspective view of the upper section 52 is shown. In the preferred embodiment, the upper section 52 comprises a recessed area 86 that contains an upper portion of the retaining and rotation component 50 when the trimmer head 10 is fully assembled.

Figure 10:
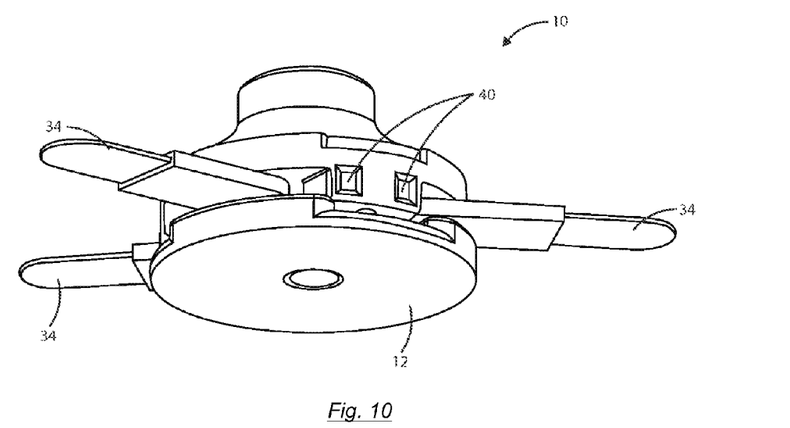
FIG. 10 is a perspective view of the trimmer head in an engaged configuration in a blade trimming mode wherein the top plate and bottom plate are engaged.

FIG. 10 depicts a perspective view of the two mode trimmer head 10 in a engaged or use configuration in the blade-trimming mode. In this configuration, the bottom plate 12 and the midsection 28 are in contact with one another, the plurality of first level sections 20 are in contact with the plurality of trimmer blade posts 32, bottom plate top surface 18 is in contact with the midsection bottom surface 30. In this configuration any trimmer blades 34 pivotally mounted to the plurality of trimmer blade posts 32 are prevented from leaving the trimmer head 10 by the contact between the plurality of first level sections 20 with the end portion 88 of the trimmer blade posts 32. It should be noted that this is the same configuration of the bottom plate 12 and the midsection 28 that would be used for the monofilament-trimming mode, the difference being that there would be the monofilament line 42 installed in the plurality of monofilament conduits 40 and no trimmer blades 34 mounted. In a less ideal configuration, both monofilament line 42 and trimmer blades 34 may be used simultaneously.

Figure 11:
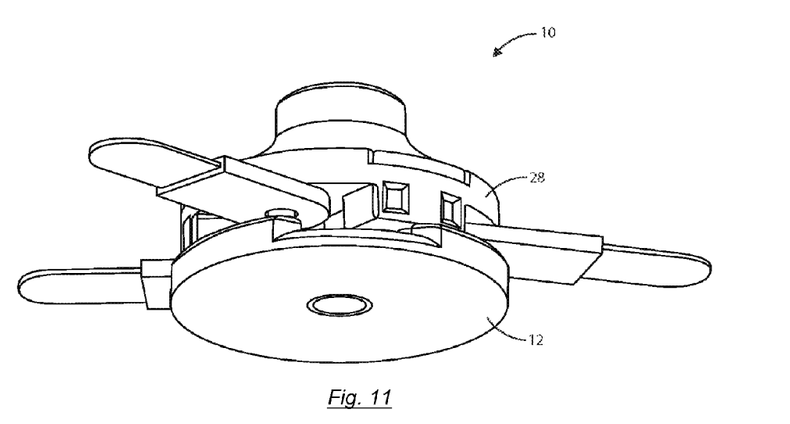
FIG. 11 is a perspective view of the trimmer head at a point in time is wherein it is halfway between the engaged configuration and the adjustment configuration wherein the top plate and bottom plate are partially engaged.
Figure 12:
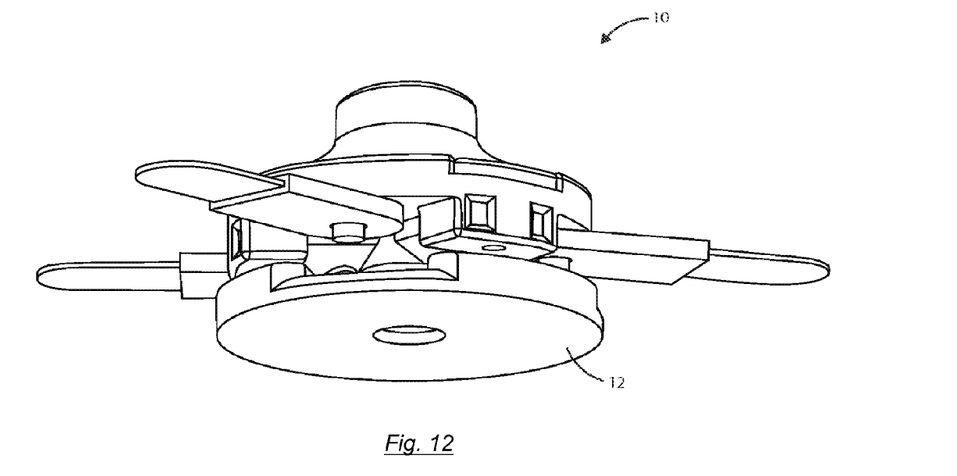
FIG. 12 is a perspective view of the trimmer head in the adjustment configuration wherein the top plate and bottom plate are not engaged.

FIGS. 10-12 depict the process of separating the bottom plate 12 and the midsection 28. Referring to FIG. 11, a perspective view of the two mode trimmer head 10 is shown at a point mid-way between the engaged or use configuration and an is adjustment configuration. As may be seen, the bottom plate 12 has been spaced away from relative to the midsection 28 and has been partially rotated to approximately 15 degrees.

Referring to FIG. 12, a perspective view of the two mode trimmer head 10 in the adjustment configuration is illustrated. In this configuration, the bottom plate 12 has been spaced away from and rotated approximately thirty degrees relative to the midsection 28. From this configuration the plurality of trimmer blades 34 may be removed through the gap formed between the end portion 88 of the trimmer blade posts 32 and the plurality of first level sections 20 of the bottom plate top surface 18 (identified in FIG. 3).

Figure 13:
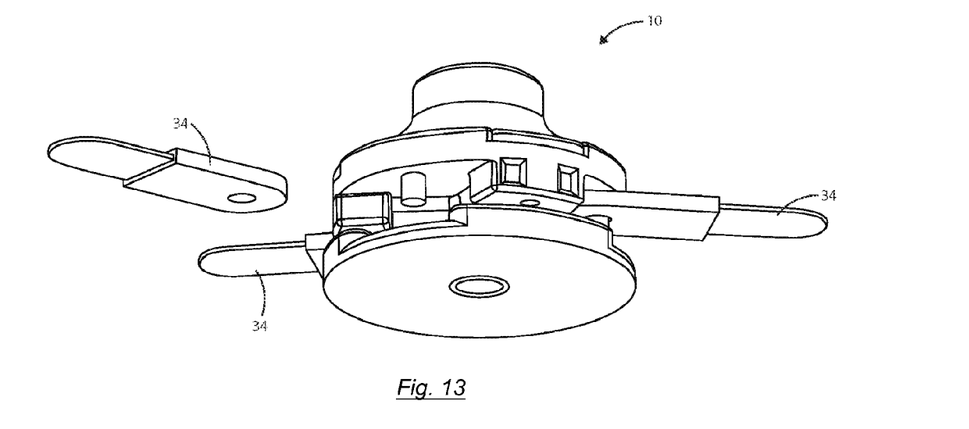
FIGS. 13 and 14 are perspective views of the trimmer head in an adjustment configuration with at least one trimmer blade removed.
Figure 14:
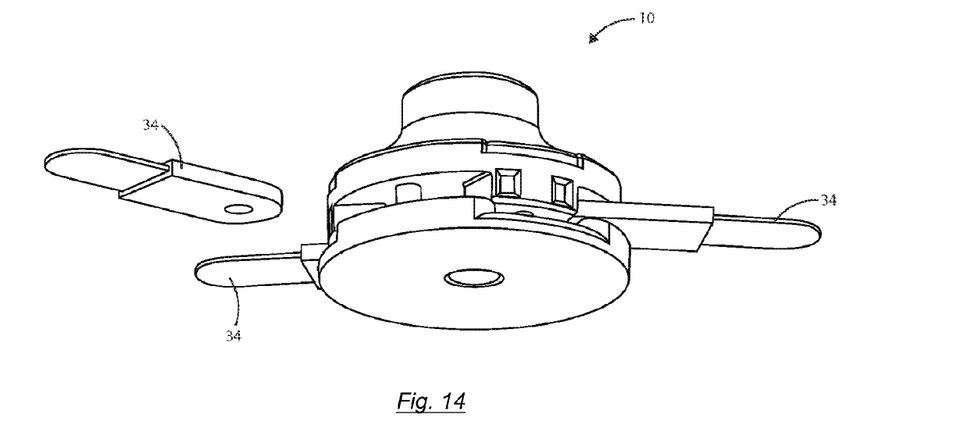
Figure 15:
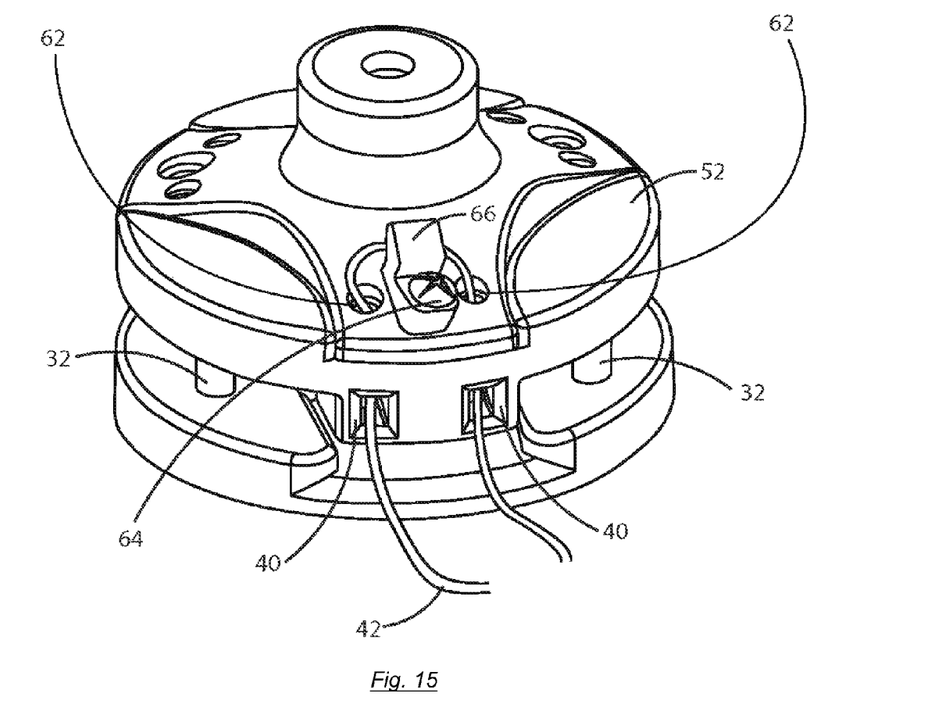
FIG. 15 is a perspective view of the trimmer head in a monofilament-trimming mode.

FIG. 13 depicts one of the plurality of trimmer blades 34 after removal. In FIGS. 12-13 the device is in the adjustment configuration. At FIG. 14 the two mode trimmer head 10 has been rotated such that the plurality of trimmer blade posts 32 now once again engage said first level holes 28. The rotation is noticeable through the changed position of the bottom plate in FIG. 14 relative to its position in FIG. 13. The urging force generated by spring 70 holds the bottom plate 12 and the midsection 28 together. Although monofilament line 42 may be inserted at any time in the process, it is preferred to occur when blades are not attached, such as is depicted in FIG. 15 because of the additional torque placed on a trimmer motor powering the rotational motion of the trimmer head. That is, when both blades and monofilament line are in use, additional torque will be required to spin the trimmer head relative to the amount of torque requires when only monofilament line or only blades are used.

Figure 20:
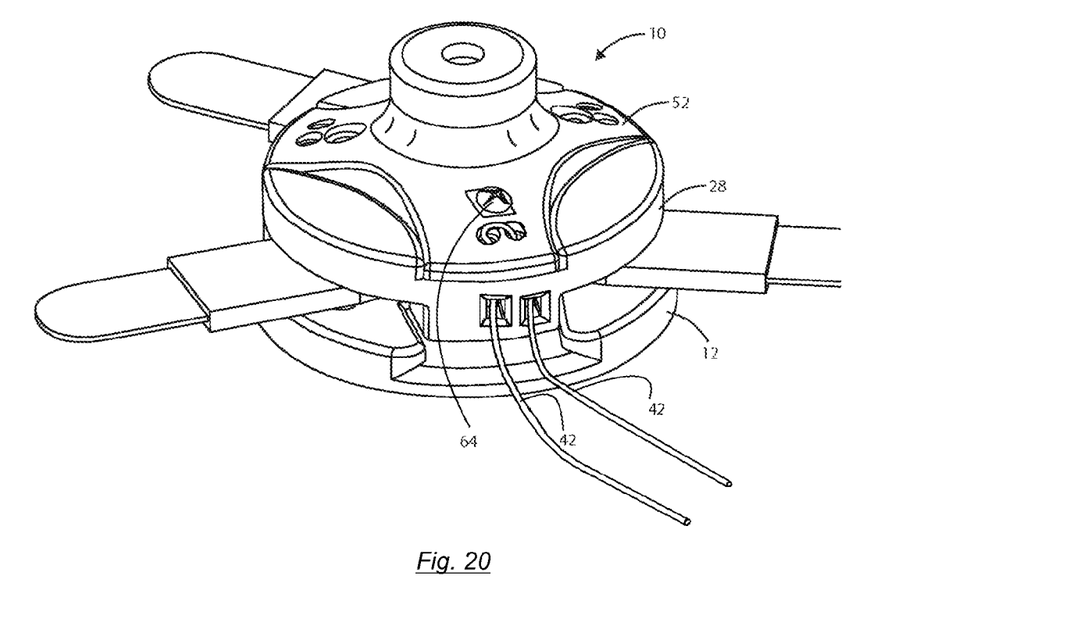
FIG. 20 is a perspective view of the invention according to a first alternative embodiment.

Here, in FIG. 15 a perspective view of the trimmer head 10 in the monofilament mode is illustrated. The at least one monofilament line 42 is engaged with the trimmer head 10 by inserting both ends thereof through the plurality of upper section monofilament holes 62 (not labeled), the plurality of midsection monofilament holes 48 (not visible in this image) and the plurality of monofilament conduits 40. It should be noted that for space saving reasons the monofilament line 42 is not shown extending out to its full length of FIG. 15. A similar image shown in FIG. 20 depicts the approximately length of the monofilament line 42 as well as the two ends of the line.

Continuing with FIG. 15, to place the two mode trimmer head 10 in the monofilament trimming mode, a short section of said monofilament trimming line 42 (see FIG. 15) is inserted into each pair of the plurality of monofilament holes 62 such that said monofilament trimming line 42 passes through said at least one pair of conduits 40. Preferably, the ends of the at least one monofilament trimming line 42 extends radially outwardly from the trimmer head 10. The ends of the plurality of monofilament conduits 40 located on the circumference of the midsection 28 may be beveled to prevent the at least one monofilament trimming line 42 from being prematurely worn or broken.

Although the trimmer head 10 has been described as including three portions (the bottom plate 12, the midsection 28 and the upper section 52, in practice it is only important that the device comprises two sections urged together and rotatable about one another and a shared central axis. Hence, the midsection 28 and upper section 52 may be thought of collectively as top plate 11. Under this interpretation the top plate and bottom plate are the combination of the key components urged together and rotatable about one another and a shared central axis. The trimmer blade post connects the two plates when in use configuration, and does not connect the two plates (that is, a gap exists between the blade post and one of the two plates) when the device is in adjustment configuration. The point of attachment of the blade post may be either the top plate or bottom plate.

Figure 16:
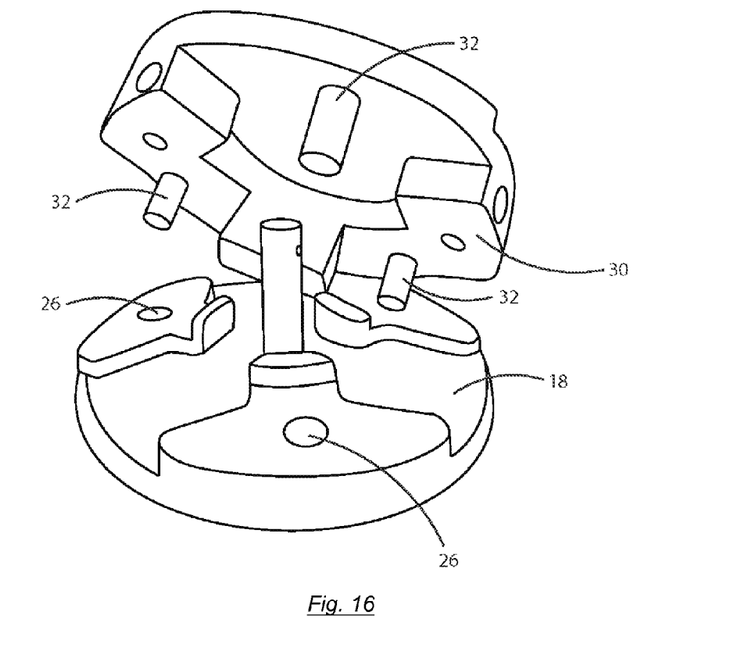
FIG. 16 is a perspective view of the bottom plate top surface and the midsection bottom surface of the two mode trimmer head.

Referring to FIG. 16, a perspective view of the invention is shown wherein the alignment of the blade posts 32 and the first level holes 26 is apparent. Here the bottom plate top surface 18 and the midsection bottom surface 30 of the two mode trimmer head 10 is illustrated. The plurality of trimmer blade posts 32 attaches with the plurality of first level holes 26 when the midsection bottom surface 30 engages with the bottom plate top surface 18.

Figure 19:
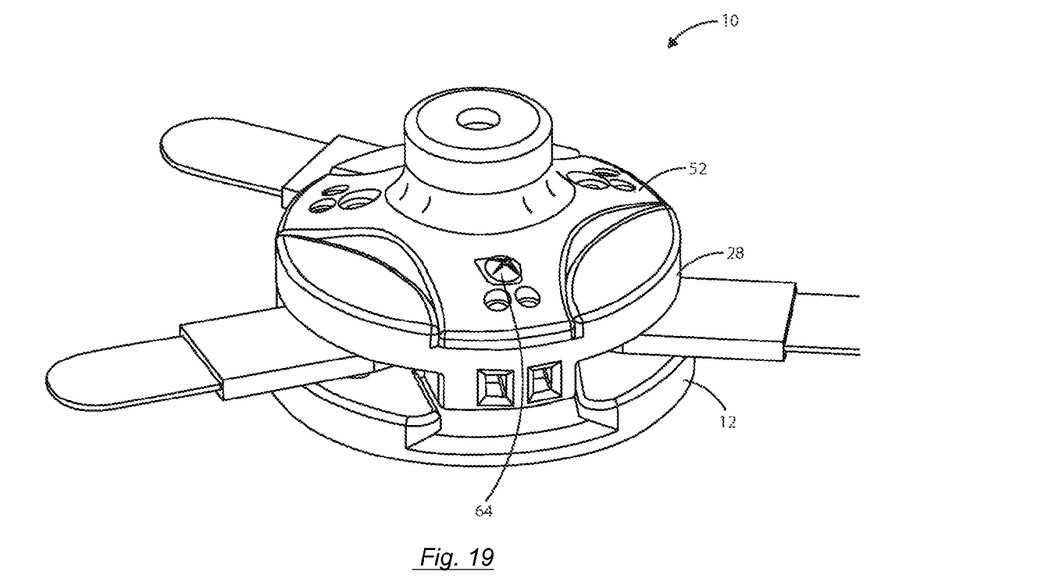
FIG. 19 is a perspective view of the invention according to a first alternative embodiment.

FIGS. 19 and 20 depict a top perspective view of another embodiment of the present invention. Here the fastener 64 (and related components) and the monofilament holes and monofilament conduits have been relocated such that the monofilament line is threaded through the top plate at a point radially outward from the fattener 64 as shown in FIG. 20. Notably, FIG. 20 also depicts the monofilament line 42 at its preferred length for all embodiments.

The foregoing description of the preferred embodiment of the present invention has been presented for the purpose of illustration and description. It is not intended to be exhaustive or to limit the invention to the precise form disclosed. Many modifications and variations are possible in light of the above teachings. It is intended that the scope of the present invention not be limited by this detailed description, but by the claims and the equivalents to the claims appended hereto.

I claim:

1. A device for cutting vegetation having a first and second configuration, the device comprising:
   a bottom plate comprising a plurality of first level sections, a plurality of second level sections, a plurality of recessed sections, and a plurality of first level holes located on the plurality of first level sections;
   a top plate removably attached to the bottom plate, the top plate including a bottom surface and a top surface;
   a retaining and rotation component allowing the bottom plate and top plate to rotate relative to one another and which urges the bottom plate against the top plate;
   wherein the bottom surface comprises a plurality of recessed portions, a bottom surface hole located at the center of the bottom surface, and a plurality of trimmer blade posts adaptable to pivotally mount at least one trimmer blade thereon to operate the device in a blade trimming mode;
   wherein the top surface comprises a trimmer attachment mount and a plurality of monofilament conduits adaptable to engage with at least one monofilament line;
   wherein in said first configuration the bottom plate engages with the top plate bottom surface such that the plurality of trimmer blade posts in the bottom surface connects with the plurality of first level holes located on the plurality of first level sections to firmly engage the at least one trimmer blade; and
   wherein in said second configuration said bottom plate is rotated relative to said top plate and disengaged from said top plate such that said at least one trimmer blade becomes disengaged from the at least one of the plurality of trimmer blade posts and the at least one of the plurality of first level sections.

2. The device of claim 1 wherein the retaining and rotation component comprises a shaft, a spring, a retaining pin and a pin hole receiving the retaining pin.

3. The device of claim 1 wherein the retaining and rotation component passes through the bottom surface hole.

4. The device of claim 1 wherein the plurality of monofilament conduits is arranged in pairs around the circumference of the top plate.

5. The device of claim 1 wherein at least one monofilament line is inserted through the plurality of monofilament conduits.

6. The device of claim 1 wherein in said first configuration the plurality of second level sections is engaged with the top plate bottom surface.

7. The device of claim 1 wherein the plurality of second level sections is positioned closer to the bottom surface than the plurality of first level sections.

8. The device of claim 1 wherein when the bottom plate is spaced away from and rotated relative to the top plate, a gap is formed between an end portion of the at least one of the plurality of trimmer blade posts and the at least one of the plurality of first level sections.

9. A trimmer head having a first and second configuration, the trimmer head comprising:
- a bottom plate comprising a plurality of first level sections, a plurality of second level sections, a plurality of recessed sections, and a plurality of first level holes located on the plurality of first level sections;
- a top plate removably attached to the bottom plate, the top plate including a bottom surface and a top surface;
- a retaining and rotation component allowing the bottom plate and top plate to rotate relative to one another and which urges the bottom plate against the top plate;
- wherein the bottom surface comprises a plurality of bottom recessed portions, a bottom surface hole located at the center of the bottom surface, and a plurality of trimmer blade posts adaptable to pivotally mount at least one trimmer blade thereon to operate the trimmer head in a blade trimming mode;
- wherein the top surface comprises a trimmer attachment mount and a plurality of monofilament conduits adaptable to engage with at least one monofilament line;
- wherein in said first configuration the plurality of trimmer blade posts in the top plate bottom surface connects with the plurality of first level holes located on the plurality of first level sections to firmly engage the at least one trimmer blade; and
- wherein in said second configuration said bottom plate is rotated relative to said top plate and disengaged from said top plate such that the at least one trimmer blade becomes disengaged from the at least one of the plurality of trimmer blade posts and the at least one of the plurality of first level sections.

10. The trimmer head of claim 9 wherein the retaining and rotation component is passes through the bottom surface hole.

11. The trimmer head of claim 9 wherein the plurality of monofilament conduits is arranged in pairs around the circumference of the top plate.

12. The trimmer head of claim 9 wherein at least one monofilament line is inserted through the plurality of monofilament conduits.

13. The trimmer head of claim 9 wherein in said second configuration the plurality of second level sections disengages from the top plate bottom surface and a gap is formed through which at least one trimmer blade may pass.

14. The trimmer head of claim 9 wherein in said first configuration the plurality of second level sections is engaged with the top plate bottom surface.

15. The trimmer head of claim 9 wherein the plurality of second level sections is positioned closer to the bottom surface than the plurality of first level sections.

16. A trimmer head adaptable to operate in two modes, comprising:
- a bottom plate comprising a plurality of first level sections, a plurality of second level sections, a plurality of recessed sections, and a plurality of first level holes located on the plurality of first level sections;
- a top plate removably attached to the bottom plate, the top plate including a bottom surface and a top surface;
- a retaining and rotation component allowing the bottom plate and top plate to rotate relative to one another and which urges the bottom plate against the top plate;
- wherein the bottom surface comprises a plurality of bottom recessed portions, a bottom surface hole located at the center of the bottom surface, and a plurality of trimmer blade posts adaptable to pivotally mount at least one trimmer blade thereon to operate the trimmer head in a blade trimming mode;
- wherein the top surface comprises a trimmer attachment mount and a plurality of monofilament conduits arranged in pairs around the circumference of the top surface adaptable to engage with at least one monofilament line;
- wherein in said first configuration the plurality of trimmer blade posts in the top plate bottom surface connects with the plurality of first level holes located on the plurality of first level sections to firmly engage the at least one trimmer blade;
- wherein in said second configuration said bottom plate is rotated relative to said top plate and disengaged from said top plate such that the at least one trimmer blade becomes disengaged from the at least one of the plurality of trimmer blade posts and the at least one of the plurality of first level sections.

17. The trimmer head of claim 16 wherein the retaining and rotation component is passes through the bottom surface hole.

18. The trimmer head of claim 16 the at least one monofilament line is inserted through the plurality of monofilament conduits.

19. The trimmer head of claim 16 wherein in said first configuration the plurality of second level sections is engaged with the top plate bottom surface.

20. The trimmer head of claim 16 wherein the plurality of second level sections is positioned closer to the bottom surface than the plurality of first level sections.

21. The trimmer head of claim 16 wherein when the bottom plate is spaced away from and rotated relative to the top plate, a gap is formed between the end portion of the at least one of the plurality of trimmer blade posts and the at least one of the plurality of first level sections.

22. The trimmer head of claim 16 wherein the plurality of monofilament conduits is arranged at about sixty degrees from the plurality of trimmer blade posts.

* * * * *